United States Patent Office 2,742,425
Patented Apr. 17, 1956

2,742,425
ACIDIZING SILICEOUS FORMATIONS

Orrin C. Holbrook, Crystal Lake, Ill., assignor to The Pure Oil Company, Chicago, Ill., a corporation of Ohio No Drawing. Application January 26, 1954,
Serial No. 406,347

4 Claims. (Cl. 252—8.55)

This invention relates to the acid treatment of geological formations. It is especially directed to improving the efficiency of acidization of siliceous subterranean deposits to reduce the resistance of these formations to fluid flow therethrough.

Although acidization has long been employed in the exploitation and development of fluid producing reservoirs as a means for promoting the drainage efficiency of wells, the use of acidizing reagents has generally been confined to calcareous or siliceous formations containing a considerable amount of calcareous components. In treating these formations, the acidizing reagents react with the calcareous deposits to produce a reaction effluent which may be readily flushed from the formation. As a result, the formation is broken down thereby increasing the porosity and permeability of the formation near the borehole as well as increasing the size of the drainage cavity of the well. To effecuate these objectives, the use of hydrochloric acid has achieved notable results as a single reagent suitable for this service, whereas other strong mineral acids per se, such as sulfuric and nitric acids, produce an inimical result which makes their use unsatisfactory. Excellent results obtained in treating calcareous geological formations with hydrochloric acid have made petroleum engineers appreciative of the efficiency of acidizing processes as a well completion expedient. However, siliceous geological formations which consist essentially of silica have not responded to the acidizing technique, even though there have been a number of chemical reagents which will attack silica, because of the undesirable characteristics of treating solutions containing these reagents. After an extensive investigation of the problem of acidizing siliceous formations, it has been found that the acidizing of these formations can effectively be carried out by employing an aqueous solution of a fluophosphoric acid. The use of fluophosphoric acid permits the formulation of an aqueous acidizing reagent which has a reactivity substantially equivalent to that of hydrogen fluoride and hydrofluoric acid without any of the chemical and physiological drawbacks attendant upon their use. The acidizing of siliceous formations using fluorphosphoric acid-containing treating solutions is described and claimed in U. S. Patent 2,644,398. While in general this process is availing for treating siliceous formations, formations are encountered which contain components which form precipitates when in contact with the acidizing reagent. It has been found that ferrous constituents, in particular, have a depreciating effect on the efficiency of the process.

Accordingly, it is an object of this invention to provide a fluophosphoric acid-containing reagent having an improved effectiveness for treating siliceous geological formations which produce precipitates. It is also an object of this invention to provide a process for acidizing siliceous formations containing ferrous constituents. A further object of this invention is to provide a process and reagents for acidizing siliceous formations which minimize the formation of insoluble precipitates such as salts of iron, aluminum, and calcium which tend to clog the interstices of siliceous formations undergoing acid treatment. These and other objects will become more apparent from the following detailed discussion of this invention.

In treating siliceous geological formations containing therein ferrous, aluminum, or calcium constituents with the fluophosphoric acid-treating process described in U. S. Patent 2,644,398, there are produced insoluble precipitates within the formation which would lessen the effectiveness of the acidizing process. In accordance with this invention, it has been found that the precipitation of insoluble ferrous materials and other insoluble precipitates in the acidizing of formations with a fluophosphoric acid-containing treating solution is greatly minimized by admixing with the treating solution a sufficient amount of strong mineral acid which will not produce an insoluble precipitate when in contact with the formation being treated. In carrying out this invention any fluophosphoric acid may be employed. This includes the manofluorophosphoric, $H_2PO_3F$, difluophorphoric, $HPO_2F_2$, hexafluophosphoric, $HPF_6$, as well as mixtures of these acids for preparing the main constituent of the acidizing reagent. The composite reagent of this invention is then prepared by commingling with the fluophosphoric acid solution a strong mineral acid which will not form an insoluble precipitate when in contact with a siliceous material. The preferred strong mineral acid for use in this invention is hydrochloric acid; however, other suitable acids include nitric acid, permanganic acid, other haloid and the oxyhalogen acids such as hydriodic, hydrobromic, iodic, perchloric, periodic, as well as other strong mineral acids having a degree of ionization of not less than about 0.5. Obviously excluded from the scope of this invention are those strong mineral acids, which, when in contact with the formations will form insoluble precipitates which will tend to clog the interstitial openings of the reservoir. For example, in operative acids are sulfuric which forms insoluble calcium sulfate; hydrofluoric which forms gelatinous insoluble precipitates such as calcium and magnesium compounds when in contact with calcium and magnesium salts frequently present as constituents of siliceous geological strata, and phosphoric which forms insoluble phosphates.

The effectiveness of the instant invention is illustrated by the following data which was obtained by passing a fluophosphoric acid-containing acidizing reagent at room temperature through a 12″ long core of rectangular cross-section prepared from Berea sandstone. The solid constituents of the reaction effluent were recovered and spectrographically analyzed. These analyses for several different experiments are shown in Table I in which the portion of total effluent tested represents that fraction of the total effluent recovered from each run and separately tested.

TABLE I
Analyses of precipitates

| Run No. | Aqueous Acidizing Reagent | Portion of Total Effluent Tested | Content, Percent by Weight | | | |
|---|---|---|---|---|---|---|
| | | | Al | Fe | Ca | P |
| 1 | 25 w. percent $HPO_2F_2$ + 0.18 percent EDTA[1] | First 250 cc. | <2 | 16.5 | <1 | 15 |
| 2A | 25 w. percent $HPO_2F_2$ | First 10 cc. | 5.2 | 15.0 | 5.2 | (²) |
| 2B | 25 w. percent $HPO_2F_2$ | Following 10 cc. | 6.4 | 10.5 | 7.6 | (²) |
| 3 | 25 w. percent $HPO_2F_2$ | | <2 | 33 | 0.6 | 23 |

[1] EDTA = Ethylene diamine tetracetic acid.
[2] Insufficient sample.

It will be noted that iron, probably present as the phosphate, forms a considerable proportion of the precipitated material. It is also seen that if a suitable complexing agent is not employed appreciable amounts of water-insoluble calcium and aluminum salts are produced. The data reported in run No. 3 of Table I was obtained by analyzing the precipitate which settled out of a spent fluophosphoric acid-treating solution backflushed from a field-treated siliceous geological formation.

The same type of experiment was then conducted using the acidizing reagent of this invention wherein a minor amount of a strong mineral acid, hydrochloric acid, was admixed with the fluophosphoric acid solution employed as the acidizing reagent. The results from these experiments are tabulated in Table II.

TABLE II

*Analyses of precipitates*

| Run No. | Aqueous Acidizing Reagent | Portion of Total Effluent Tested | Content, Percent by Weight | | | |
|---|---|---|---|---|---|---|
| | | | Al | Fe | Ca | P |
| 1A | 25 w. percent $HPO_2F_2$+10 w. percent HCl | First 250 cc. | <2 | <1 | <1 | 2.5 |
| 1B | 25 w. percent $HPO_2F_2$+10 w. percent HCl | Second 250 cc. | <2 | <1 | <1 | <2 |
| 1C | 25 w percent $HPO_2F_2$ | Remaining 2,000 cc. | <2 | <1 | <1 | <2 |

From the data shown in Table II, it is seen that only trace amounts of precipitated ferrous compounds were formed during the experiment, a result not obtained when a well known sequestering agent, ethylene diamine tetraacetic acid, which has the ability to complex iron, was employed as an additive in the treating solution. The data also shows that the formation of water-insoluble aluminum and calcium precipitates is minimized without the use of a sequestering agent. In both Tables I and II, several items are reported as being present in an amount less than, "<." This indicates that these respective elements were detected; however, the limitations of the spectrometer employed in analyzing the precipitates prevented a more accurate determination. Accordingly, these amounts are the respective quantitative limits of accuracy of the spectrometer employed for these particular elements.

Another feature of this invention is found in the enhanced effectiveness of hexafluophosphoric acid in the treating of siliceous geological formations. In U. S. Patent 2,664,398, it is pointed out that the effectiveness of the fluophosphoric acid-treating reagents is dependent upon the extent of hydrolysis of the fluophosphoric acid employed. Therefore, from a practical standpoint, difluophosphoric acid is the preferred reagent to be employed in treating siliceous formations because hydrolysis of difluophosphoric acid is very rapid, producing a treating solution which can be used at once without waiting for complete hydrolysis to occur. Although unmodified hexafluophosphoric acid-containing treating solutions demonstrate an ability to react with siliceous materials to effect their disintegration by chemical reaction, the commercial use of this acid has been avoided because of the time required for hydrolysis of this acid. Accordingly, it was preferred to employ other forms of fluophosphoric acids in preparing the acidizing reagent. However, by employing the instant invention it has been found that hexafluophosphoric acid in combination with one of the aforementioned suitable strong mineral acids does provide a treating solution which may advantageously be employed in acidizing of siliceous formations. This feature is shown in Table III, which illustrates the extent of hydrolysis of several hexafluophosphoric acid solutions.

TABLE III

*Hydrolysis of hexa-fluophosphoric acid*

| Time | Aqueous Acidizing Reagents | | | | |
|---|---|---|---|---|---|
| | 9.15 Wt. Percent $HPF_6$ | 8.5 Percent $HPF_6$ + $SiO_2$ | 9.2 Wt. Percent $HPF_6$ + 5.0 Wt. Percent $HPO_2F_2$ | 8.0 Wt. Percent $HPF_6$ + 8.0 Wt. Percent HCl | 8.5 Wt. Percent $HPF_6$ + 10.0 Wt. Percent HCl + $SiO_2$ |
| | Percent Degree of Hydrolysis | | | | |
| 20 | 1 | 2 | 7 | 37 | 70 |
| 40 | 2 | 6 | 9 | 47 | 89 |
| 60 | 3 | 7 | 20 | 57 | 95 |
| 80 | 4 | 8 | 27 | [1] 66 | 100 |
| 100 | 5 | 9 | 34 | [1] 74 | |
| 120 | 8 | 10 | 42 | [1] 85 | |
| 140 | 12 | 11 | 47 | [1] 94 | |
| 150 | | | | [1] 100 | |
| 160 | 14 | | 51 | | |
| 180 | 16 | | 55 | | |
| 200 | 18 | | 58 | | |

[1] Extrapolated.

It will be noted in Table III that in the absence of a strong mineral acid such as HCl the rate of hydroylsis is inordinately slow. This factor would make undesirable the use of hexafluophosphoric acid in conventional acid-treating processes. While admixtures of hexafluophosphoric acid and another fluophosphoric acid such as difluophosphoric acid hydrolyze with greater celerity the rate is still comparatively slow. However, upon the addition of HCl, the rate of hydrolysis is sufficient to provide a commercially suitable acidizing reagent. It is also noted that the rate of hydrolysis of this latter admixture is further accelerated when in contact with silica.

This aspect of the invention has important application where acidizing reagents of superior penetrating characteristics are desired. Normally, high reactive acids are most desirable in the treating of wells. However, these acids when in contact with formations that are very susceptible to acid treating become spent before producing maximum results. When it has been desired to formulate treating agents for use in acidizing geological formations at points remote from the borehole, the prior art has chosen to minimize the action of treating reagents by the addition of a suitable inhibitor for this purpose. For example, in employing hydrochloric acid in treating calcareous formations, sodium hexametaphosphate may be added to the treating solution to retard its reactivity in accordance with the teachings of Morgan in U. S. Patent 2,128,161. This effect is also noted when gelled hydrochloric acid is employed in formation treating processes. In utilizing fluophosphoric acid-containing reagents in the treatment of siliceous formations, it has been found that this type of prior art expedient can be avoided by using an acidizing reagent prepared by admixing hexafluophosphoric acid and a suitable strong mineral acid such as hydrochloric acid.

While aqueous solutions of hexafluophosphoric acid, when hydrolyzed to equilibrium conditions, are substantially as reactive as difluophosphoric acid solutions containing the same concentration of fluophosphoric acid, their resistance to hydrolysis under normal conditions makes their use in acidizing solutions unsatisfactory. It has been found that by modifying their rate of hydrolysis, solutions of sufficient reactivity and promptitude to permit their use in the acid treatment of siliceous formations can be prepared. While these solutions have these necessary attributes, the rate of hydrolysis is still sufficiently slow to avoid making immediately available all of the products of hydrolysis which are the active constituents of the treating solution. Therefore, by controlling the hydrolysis of the hexafluophosphoric acid to make available the products of hydrolysis over a reasonable period of time, deep penetration of the formation with an active acidizing solution is permitted. This feature of the invention is further illustrated by an experiment on which several one-foot long Berea sandstone cores were treated with a variety of acidizing reagents, each formulated to provide a solution which had a hydrogen fluoride content theoretically equivalent to about 10 w. percent. In each instance, a separate core was treated by introducing the acidizing reagent into the core at a constant pressure by maintaining a differential pressure of 100 p. s. i. across the core. The acidizing reagent was prepared by admixing the acidic constituents and water, and immediately introduced into the core. Each solution used had a residence time in the core of about 10 minutes. It was found that when an aqueous acidizing solution containing 25 w. percent difluophosphoric acid and 10 w. percent hydrogen chloride was used, only spent acid was found in the effluent recovered from the core. However, when an aqueous treating solution was prepared using 16 w. percent hexafluophosphoric acid and 12.5 w. percent hydrogen chloride the effluent withdrawn from the core treated with said solution, upon analysis, showed that only about 50% of the acidizing solution was spent. This clearly shows that localized action is avoided by use of the latter solution, permitting an active reagent to penetrate into formation areas not reached by the more readily hydrolyzable forms of the fluophosphoric acids without unduly delaying the time required for the treatment.

To prepare the acidizing reagent of this invention, it is simply necessary to admix a suitable amount of suitable strong mineral acid with the selected fluophosphoric acid-treating solution and introduce the composite reagent into the formation according to conventional acidizing techniques. In the preferred method, separate streams of water, hydrochloric acids or hydrogen chloride, and fluophosphoric acid are simultaneously introduced into the tubing within the well bore at the well head. The admixing of the several components of the treating solution is effected in the tubing and the resulting solution is then forced directly into the formation. In blending the various components of the reagent of this invention, it has been found that a suitable solution can be prepared by admixing from 10 to 15 parts by weight of hydrogen chloride, 15 to 35 parts by weight of a fluophosphoric acid, and 75 to 50 parts by weight of water. These proportions, however, are only illustrative and amounts outside these ranges as well as other acidic constituents can be employed. The amount of acid used will depend upon the thickness, permeability, porosity, and other lithological characteristics of the siliceous formation being treated as well as the formation pressure and size of the well cavity. Generally from about 10 to 200 barrels of acid are used in a single charge. However, it may be necessary to employ a quantity of acidizing reagents in excess of these amounts, or employ stage treatment methods.

Although this invention is primarily directed to the prevention of insoluble ferrous precipitates in a siliceous geological formation during the acidizing of the formation with a fluophosphoric acid-containing reagent, it also permits a higher tolerance of calcium components in the formation than would be permitted in employing an unmodified fluophosphoric acid-treating solution. Although in certain instances the use of this invention will only mitigate the formation of the insoluble precipitate, it has been found that the precipitates which are formed are crystalline in nature and tend to be non-clogging rather than the gelatinous precipitates having clogging characteristics which may be formed when certain siliceous formations are contacted with an unmodified fluophosphoric acid-containing treating reagent. Therefore, by employing this invention in the acidizing of siliceous formations, precipitation of insoluble materials described above is substantially minimized, resulting in a beneficial improvement in the acid treatment of siliceous formations with fluophosphoric acid-containing reagents.

What is claimed is:

1. In a process for acid treating siliceous geological formations containing ferrous constituents to mitigate the formation of insoluble ferrous precipitates which tend to clog the interstitial passages of said formation, the step which comprises contacting said formation with an aqueous solution of hexafluophosphoric acid and hydrogen chloride, said hexafluophosphoric acid being present in an amount sufficient to reduce the resistance of said formation to fluid flow therethrough, and said hydrogen chloride being present in an amount sufficient to mitigate the formation of said ferrous precipitates.

2. A process in accordance with claim 1 in which said aqueous solution comprises 10–15 parts by weight of hydrogen chloride, 15–35 parts by weight of hexafluophosphoric acid and 75–50 parts by weight of water.

3. An acidizing reagent for use in treating a siliceous geological formation containing ferrous, aluminous, or calcareous constituents to mitigate the formation of insoluble ferrous, aluminous, or calcareous precipitates which tend to clog the interstitial passages of said formation, which comprises an aqueous solution of hexafluophosphoric acid and hydrogen chloride, said hexafluophosphoric acid being present in an amount sufficient to reduce the resistance of said formation to fluid flow therethrough, and said hydrogen chloride being present in an amount sufficient to mitigate the formation of said ferrous, aluminous, and calcareous precipitates.

4. An acidizing reagent in accordance with claim 3 in which said aqueous solution comprises 10–15 parts by weight of hydrogen chloride, 15–35 parts by weight of hexafluophosphoric acid, and 75–50 parts by weight of water.

References Cited in the file of this patent

UNITED STATES PATENTS

| | | |
|---|---|---|
| 2,094,479 | Vandergrift | Sept. 28, 1937 |
| 2,175,081 | Grebe | Oct. 3, 1939 |
| 2,225,695 | Henderson et al. | Dec. 24, 1940 |
| 2,300,393 | Ayers | Nov. 3, 1942 |
| 2,367,350 | Heigl | Jan. 16, 1945 |
| 2,664,398 | Bond | Dec. 29, 1953 |
| 2,690,428 | Bond et al. | Sept. 28, 1954 |